United States Patent Office 2,769,964
Patented Nov. 6, 1956

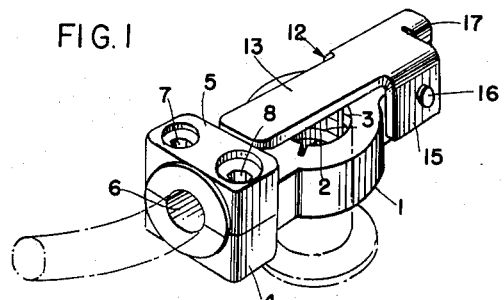
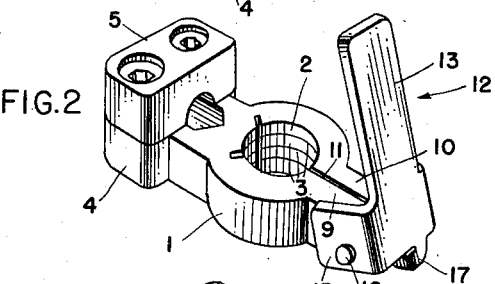
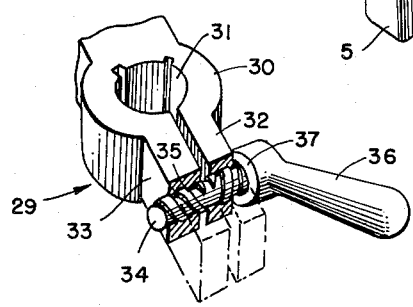
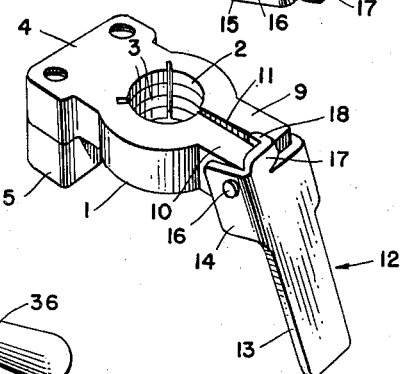
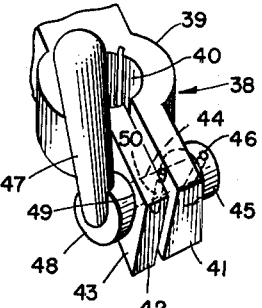
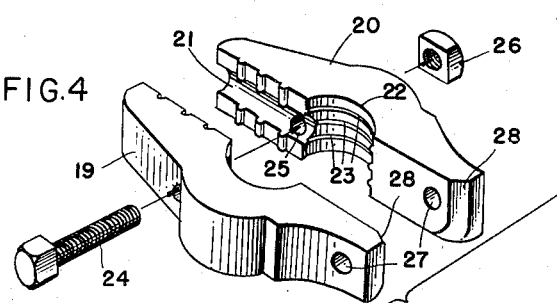
INVENTOR.
GEORGE F. LARTZ

2,769,964

BATTERY TERMINAL CONNECTOR

George F. Lartz, Suring, Wis.

Application January 30, 1952, Serial No. 269,043

1 Claim. (Cl. 339—226)

This invention relates in general to battery terminal connectors and, more particularly, to connectors adapted to be applied to automobile batteries for connecting such batteries with the ignition system of the automobile.

It is well-known that the terminals of the automobile storage batteries become encrusted with corrosion after prolonged use due to the acid in the battery, and difficulty is often experienced in attempting to remove the cable connector from the battery terminal either for testing or to permit removal of the battery for recharging or replacement. The corrosion is often so great that the cable connector cannot be removed without first scraping the encrusted layers from around the connector and the terminal and thereafter employing additional tools for prying the connector from the terminal. Sometimes it may even be necessary to saw or chisel off the standard type of battery connector.

The present invention is designed to overcome these difficulties inherent in battery terminal cable connectors heretofore known and presently in use. The present invention enables the connector to be manually removed from the battery terminal quickly and easily without the use of additional tools and without the additional and unpleasant necessity of scraping much of the corrosive substance from the terminal.

It is, therefore, the principal object of the present invention to provide a storage battery cable connector which will overcome the difficulties of removal inherently present in the connectors heretofore known.

Another object of the invention is to provide a cable connector for storage batteries which embodies a clamp arrangement manually operable to clamp the connector securely to the battery terminal and to release the connector from the battery terminal for removal.

A further object of the invention is to provide a cable connector for the terminals of storage batteries wherein the connector is formed to clamp onto the battery terminal by means of a pivoted lever and wherein the same lever may be operated to cause the instantaneous release of the connector from the terminal.

Still another and more specific object of the invention is to provide a cable connector for the terminal of storage batteries wherein the opposed sides of the connector are formed so that they may be clamped around the battery terminal and held in clamped position by means of a lever and wherein the sides of the connector may be forced to non-clamping position by appropriate movement of the same lever to permit removal of the connector from the terminal.

A still further specific object of the invention is to provide a cable connector for the terminal of storage batteries wherein the opposed sides of the connector are formed so that they may be clamped around the battery terminal and pressed together to clamping position by means of a threaded pin threadedly engaging an opening in one of the opposed sides and having a lever arm at one end of the pin for rotating the pin and causing the opposed sides of the connector to be moved either together or apart.

Another object of the invention is to provide a cable connector with opposed sides for clamping around a storage battery terminal and wherein the sides may be pressed together by the use of complementary camming surfaces on one of the opposed sides and on a collar in contact therewith, the collar having a camming surface thereon and fixed to one end of a pin passing through the opposed sides of the connector.

Other objects and advantages of the invention will become apparent upon reading the following description taken in conjunction with the accompanying drawing in which:

Fig. 1 is a perspective view of one embodiment of the invention illustrating the lever in clamping position;

Fig. 2 is a perspective view of the connector embodying the present invention illustrating the lever approaching the release position;

Fig. 3 is a perspective view similar to Fig. 2 but showing the underside of the connector and illustrating the lever in its fully released position;

Fig. 4 is an exploded view illustrating the various parts of a modified form of device embodying the invention;

Fig. 5 is a perspective view of a further modified form of the device illustrating different means for moving the opposed sides of the connector closer together and farther apart; and Fig. 6 is a perspective view of a still further modified form of device wherein the opposed sides of the connector are moved by complementary camming surfaces and a chamferred member therebetween.

Referring now more particularly to the drawing and especially to Figs. 1, 2 and 3, the connector of the present invention embodies a main or body portion 1 having a circular opening 2 extending vertically therethrough and adapted to receive a battery terminal in the manner illustrated by the dot dash lines in Fig. 1. The inner surface of the opening 2 is preferably provided with a plurality of annular serrations or ribs 3 which are designed to bite into the battery terminal and securely hold the connector against slipping.

The form of the invention illustrated in Figs. 1, 2 and 3 show the main body 1 of the device as terminating at one end thereof in an enlarged portion 4 adapted to have a similarly shaped member 5 applied to the top thereof. The members 4 and 5 have complementary semi-circular grooves in their adjacent surfaces so that when the two members are placed together there will result a circular opening 6 adapted to receive the cable from the ignition system. The two members 4 and 5 may be secured together by means such as the screws 7 and 8.

The opposite end of the main body 1 is provided with extensions 9 and 10 separated by the space indicated at 11. The space 11 is sufficiently wide to enable the extensions 9 and 10 to be pressed together and cause the annular ribs 3 to securely grip the battery terminal. These extensions 9 and 10 may also be spread apart upon the application of sufficient force in the space therebetween to enable the device to be removed from a battery terminal.

The extensions 9 and 10 may be pressed together for gripping the terminal and pried apart for removing the device from the terminal by means of a specially designed lever arm generally indicated at 12. This lever consists of an elongated handle part 13 terminating at one end in side wall portions 14 and 15. These side wall portions or flanges 14 and 15 are not parallel, but diverge outwardly from the handle portion 13.

While the outer surfaces of the flanges 14 and 15 may be parallel, if so desired, it is important that the inner sides of these flanges diverge outwardly in order to act as a wedge between the sides of which the two extensions 9 and 10 may be pressed together. The wedging action of the diverging surfaces is accomplished by properly pivoting the lever 12 to the extensions 9 and 10 by means of the pivot pin 16. The pivot pin 16 is preferably located near the outer upper corner of the extensions 9 and 10 as more clearly shown in Fig. 1. It is thus evident that when the lever 12 is moved downwardly so that the handle 13 thereof lies across the body portion 1, the two extensions 9 and 10 will be pressed together between the inner surfaces of the flanges 14 and 15. This action of the lever will cause the sides of the opening 2 containing the ribs 3 to bite into the battery terminal and be securely clamped thereto. When the lever 12 is pivoted upwardly to the position shown in Fig. 2, there will no longer be a wedging action of the flanges 14 and 15 because of the greater distance between the outer ends of these flanges.

The inner and pivoted end of the lever member 12, which is integral and of uniform thickness as shown, is provided with a central arm 17 terminating in a depending finger 18 the sides of which converge outwardly in the form of a wedge. The finger 18 is positioned in line with the space 11 between the extensions 9 and 10 whereby further pivotal movement of the lever 12 outwardly beyond the position thereof shown in Fig. 2 to the position shown in Fig. 3 will cause the forward edge of the finger 18 to move progressively into the space 11 where the converging sides thereof will force the extensions 9 and 10 farther apart. This action causes a release of the main body 1 from the battery terminal by spreading the sides of the opening 2 outwardly and releasing the ribs 3 from contact with the battery terminal.

When the connector is thus pried loose from the battery terminal it may be easily lifted therefrom without the necessity of using any tools for this purpose such as screwdrivers and pliers. All of the elements necessary to clamp the connector in place and to pry it loose from the battery terminal are embodied in the device itself as an integral part thereof thereby greatly facilitating the application and removal of the terminal connector.

Fig. 4 illustrates a modified embodiment of the invention where the structure of the body part is different although the lever arm 12, as described above, is applicable for use therewith. The form of the invention disclosed in Fig. 4 constitutes the two separate side members 19 and 20 wherein one end of each member has an elongated semi-circular groove 21 adapted when placed together to form a circular opening for the reception of the cable from the ignition system. Intermediate the ends of each member 19 and 20 a semi-circular opening 22 is provided at substantially right angles to the groove 21 and each opening 22 is provided with a series of vertically spaced serrations or ribs 23. When the two members 19 and 20 are properly placed together, the semi-circular openings 22 will form a complete opening for the reception of the battery terminal. The two members may be secured together by means of a bolt 24 received in openings 25 and secured in place by the nut 26. When the two members are thus properly secured together, the cable may be rigidly held in the opening provided by the grooves 21 by tightening the nut 26.

The lever arm 12 illustrated in Figs. 1, 2 and 3 may then be applied to the device by pivoting the lever thereto in the same manner as described above, the pivot pin being received through the aligned openings 27 in the opposite end of each side member 19 and 20. As explained above, the lever 12 may be moved about its pivotal point to a position across the upper side of the connector whereupon the wedging action of the inner surfaces of the flanges 14 and 15 will press the two sides together sufficiently to cause the ribs 23 to bite into the battery terminal. When it is desired to remove the connector from the terminal, it is merely necessary to rotate the lever 12 in the opposite direction about the pivotal point where the finger 18 will enter the space between the side members and force the sides apart.

If desired, the extreme end of the inner surface of each of the side members 19 and 20 may be tapered outwardly as at 28 to facilitate and insure entrance of the finger into the space between the side members.

Fig. 5 illustrates a further modification of battery terminal connector wherein a screw threaded pin is used for moving the opposed sides of the connector to clamping and non-clamping positions. The connector body 29 may be formed in accordance with either the body as shown in Figs. 1, 2, 3 or Fig. 4. In any event, a circular portion 30 will be provided having an opening 31 therein to receive the battery terminal as previously described. The opposed side portions 32 and 33 extend radially outwardly from the circular part 30 and are adapted to be moved closer together for clamping the connector onto the terminal or farther apart, in which position the connector may be removed from the terminal.

In this form of the invention, a pin 34 is provided with relatively large threads 35 which are reversely positioned on opposite ends of the pin and threadedly engage the respective openings in the opposed side members 32 and 33. A handle 36 is fixed to the outer free end of pin 34 and is provided with a shoulder 37 thereon adapted to abut against the outer surface of the side member 32. The threads 35 will be arranged in such a way that a turn of handle 36 and pin 34 through a relatively small arc will either move the opposed sides 32 and 33 together to clamping position or may move these side members away from each other to release the connector from the battery terminal.

The basic idea as presented in Figs. 1 to 4, inclusive, is still present in this construction, except that the specific means for moving the opposed side members toward and away from each other is specifically different.

In Fig. 6 a still further modified form of the invention is illustrated wherein the body of the connector is shown at 38 and which likewise has a circular enlargement 39 with an opening 40 therethrough to receive the battery terminal. The two opposed side members 41 and 42 project radially from the circular section 39 and are adapted to be moved toward and away from each other to clamping and non-clamping positions respectively.

In this form of the invention one of the opposed side members, for example, the member 42 is provided with a vertically sloping camming surface 43. Both members 41 and 42 have openings therethrough to receive a pin 44. At one end the pin is provided with a collar 45 adapted to abut against the outer face of the side member 41. The collar 45 may be held in position with respect to the pin 44 in any suitable manner, such as by a holding pin 46 passing through the collar and through the end of pin 44.

A handle member 47 is fixed to the other end of pivot pin 44 and has provided at the juncture of the handle and pivot pin a camming collar 48 having a camming surface 49 adapted to cooperate with the camming face 43 on the side member 42. In the position of the parts shown in Fig. 6 the two side members 41 and 42 are in their natural spread apart position for releasing the connector from the battery terminal. It will be clear that movement of handle 47 in a rotary fashion will cause the two camming surfaces 43 and 49 to act to move the side members 41 and 42 closer together to clamping position.

When it is desired to release the clamp from the battery terminal the handle 47 will be rotated to the position shown in Fig. 6. It is necessary, however, to force the arms 41 and 42 apart. It will be noted that the inner surfaces of these arms slope in the same direction, and a chamferred member 50 fixed to pin 44 will force its way between the arms as the pin rotates, thereby forcing the arms apart to releasing position.

Here again, the basic idea is the same as that described above, the only difference being in the specific manner of causing the two side members to move toward or away from each other for clamping and non-clamping positions, respectively.

From the foregoing description, it will be evident that a novel form of battery terminal connector has been devised wherein all of the elements necessary to secure the connector to the terminal and to pry the connector from the terminal have been incorporated as an integral part thereof. Thus, by the use of the present device, it is unnecessary to use pliers or wrenches to tighten bolts when the connector is being applied, and it is also unnecessary to use other tools such as pliers or screwdrivers to pry the connector loose from the terminal for removal.

Changes may be made in the form, construction and arrangement of parts from those disclosed herein without in any way departing from the spirit of the invention or sacrificing any of the attendant advantages thereof, provided, however, that such changes fall within the scope of the claim appended hereto.

The invention is hereby claimed as follows:

In a battery terminal connector having a clamp with a pair of arms in spaced relation with each other and forming an opening therebetween for receiving a battery terminal, an integral lever member for clamping the arms together about the battery terminal and for spreading the arms to release the terminal, said lever member being of uniform thickness and comprising an elongated handle, two side ears at one end portion of the handle and on opposite sides thereof, pivot means mounting said side ears near the respective outer upper corners of the clamp arms of the connector with the clamp arms being disposed between the ears, said side ears having opposed inner surfaces which diverge outwardly from the handle at an acute angle, the dimension between the side ears at the pivot means being greater than the dimension between the upper parts thereof to provide a clamping action between the ears upon the clamp arms as the lever member is pivoted to a closed position with the elongated handle overlying the battery terminal, and a finger member of outwardly converging wedge form and depending centrally from the end of the elongated handle adjacent the pivot mounting means positioned apart from the clamp arms when the handle overlies the battery terminal, said finger member being separate from the pivot means and movable through a path to wedge between and to separate the clamp arms as the lever member is pivoted to an open position.

References Cited in the file of this patent

UNITED STATES PATENTS

| | | |
|---|---|---|
| 1,596,891 | Rensch | Aug. 24, 1926 |
| 1,975,666 | Riddle | Oct. 2, 1934 |
| 2,113,852 | Meade | Apr. 12, 1938 |
| 2,156,013 | Graves | Apr. 25, 1939 |
| 2,156,411 | Thomas | May 2, 1939 |
| 2,299,291 | Zam | Oct. 20, 1942 |
| 2,453,474 | Thumann | Nov. 9, 1948 |

FOREIGN PATENTS

| | | |
|---|---|---|
| 458,151 | Canada | July 19, 1949 |